Aug. 27, 1946.                J. P. LUCKETT                2,406,620
              HOISTING DEVICE FOR DUMP TRUCKS AND OTHER VEHICLES
                    Filed Feb. 16, 1945          2 Sheets-Sheet 1
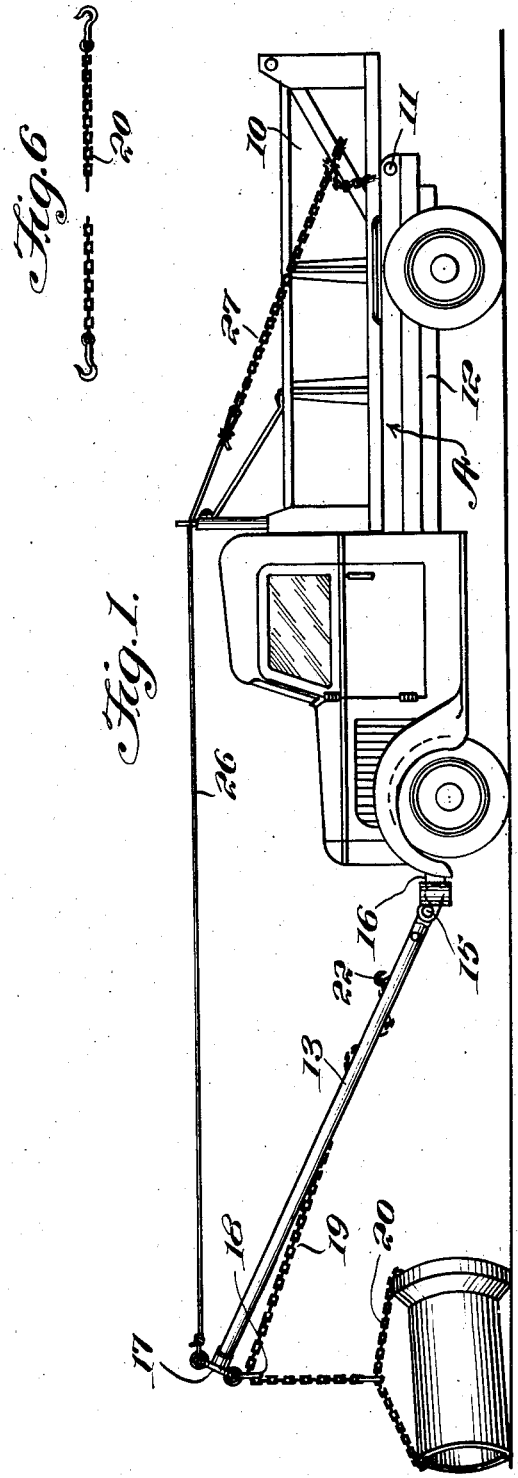
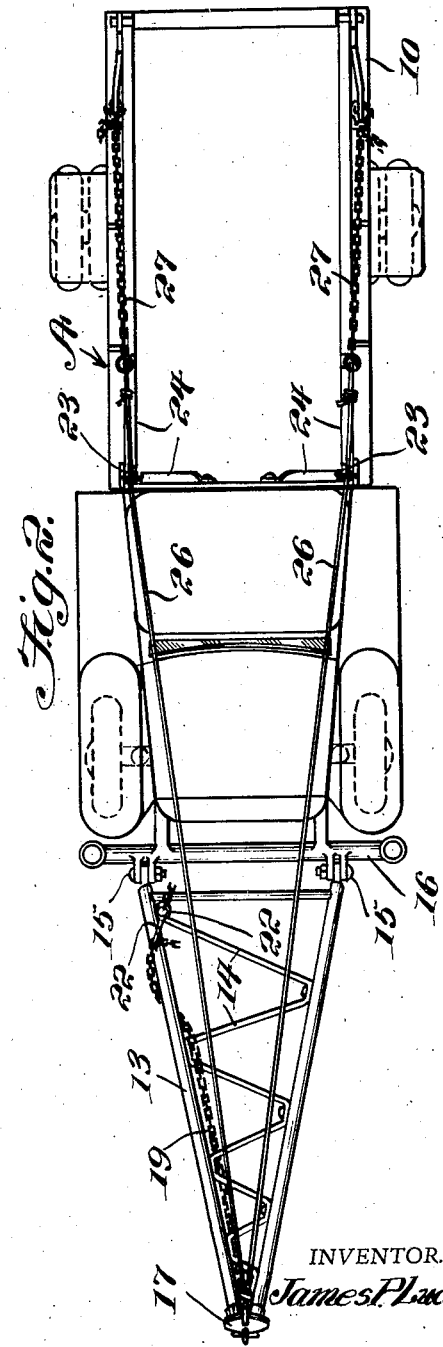
INVENTOR.
James P. Luckett,
BY Victor J. Evans & Co.
ATTORNEYS

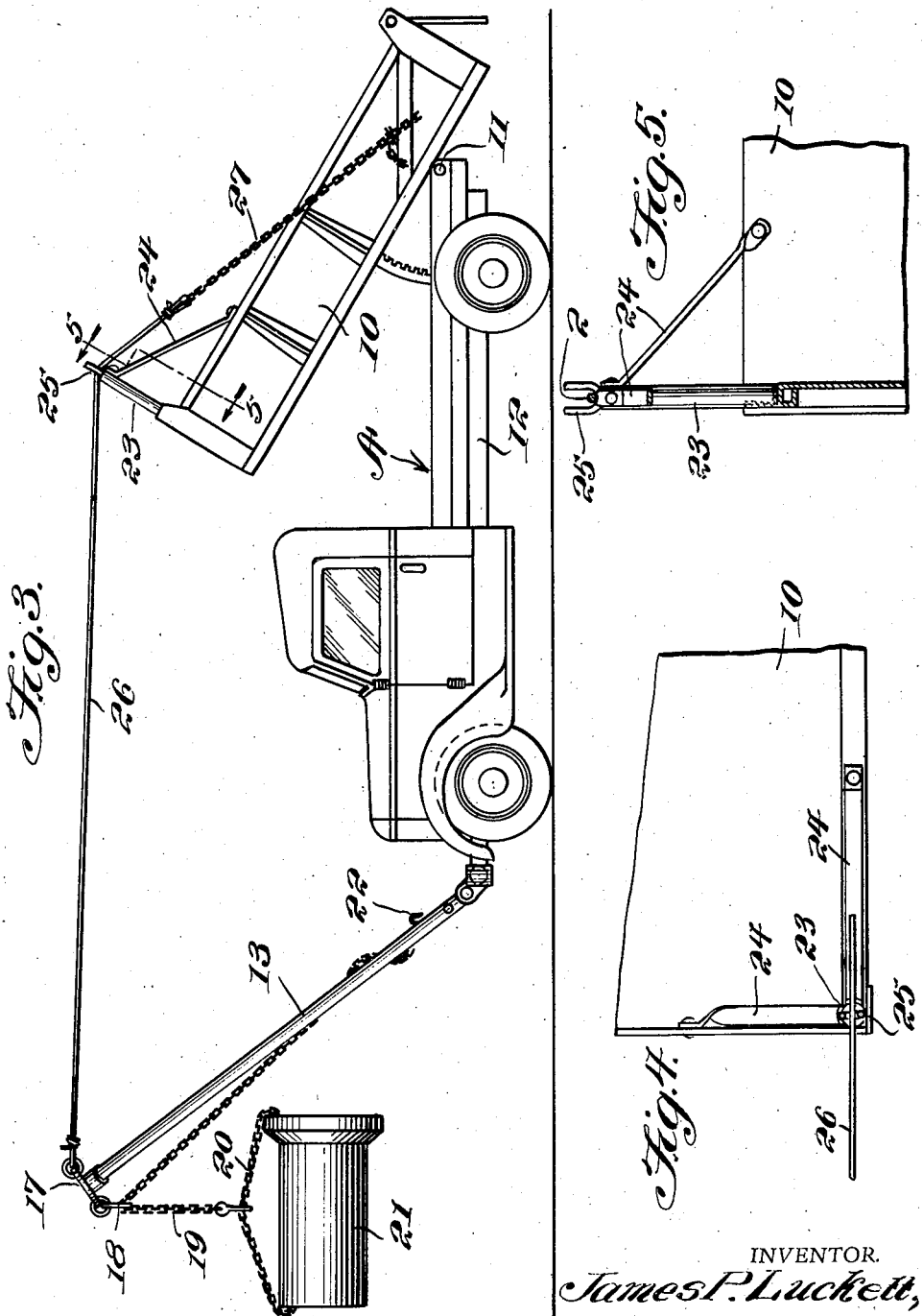

Patented Aug. 27, 1946

2,406,620

UNITED STATES PATENT OFFICE 2,406,620

HOISTING DEVICE FOR DUMP TRUCKS AND OTHER VEHICLES

James Perry Luckett, Jackson, Miss., assignor to Clifford Waterhouse, Jackson, Miss.

Application February 16, 1945, Serial No. 578,241

6 Claims. (Cl. 212—8)

The invention relates to a hoist, and more especially to a load or hoist attachment for a dump truck or other like vehicle.

The primary object of the invention is the provision of an attachment of this character, wherein hoisting mechanism is operated through the dumping action of the truck or other like vehicle, thus relieving the power takeoff unit of the truck or other vehicle from this task, the attachment being of novel construction and arrangement, so that either the hoist means can be detached from the dumping body of the truck or the like, whereby the latter can be handled independently, or the hoist may operate concurrently with the dumping body.

Another object of the invention is the provision of an attachment of this character, wherein the driving power unit for the truck or the like is out of connection with the hoist, and is useable for the driving of the said truck or the like, thus it being free of the hoist load, the hoist operating through the action of the dumping body solely.

A further object of the invention is the provision of an attachment of this character, which is simple in construction, thoroughly reliable and efficient in operation, relieving manual labor or a mechanically operating power unit for actuating the hoist, strong, durable, susceptible of lifting heavy loads, and inexpensive to manufacture and install.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is a side view of a truck with the hoisting attachment constructed in accordance with the invention applied thereto.

Figure 2 is a top plan view thereof.

Figure 3 is a view similar to Figure 1 showing the hoist in a raised position and the truck dumping body in position for the discharge of a load therefrom.

Figure 4 is a fragmentary plan view looking toward one corner of the dumping body.

Figure 5 is a sectional view taken on the line 5—5 of Figure 3 looking in the direction of the arrows.

Figure 6 is a detail of the article tying chain.

Similar reference characters indicate corresponding parts throughout the several views in the drawings.

Referring to the drawings in detail A designates generally a dumping truck or other like vehicle of any standard construction, having a vertically swinging dumping body 10, rocking on an axis 11 supported on the end of a chassis frame 12, the vehicle or the like being of the motor driven type, in this instance.

The hoisting attachment constructed in accordance with the invention for this truck A, comprises a jib or boom 13, which in this instance, is in the form of an outwardly tapered skeleton frame provided with longitudinally disposed center braces 14. The side beams of this frame at its wider inner end have hinge connections 15 with a front bumper 16 fitted with the fore of the truck. so that the jib or boom 13 can swing in a vertical direction up or down.

At the outer smaller end of the frame forming the jib or boom is a disk-like head 17, having at its lowermost portion a load line ring 18, through which is trained an adjustable load line or chain length 19, carrying a double hook article tying line 20, for the detachable fastening of an article 21 to be hoisted. The inner end of the line or chain is adapted for adjustable fastening to the frame, as at 22, or otherwise.

At each forward corner of the dumping body 10 rises a mast or stanchion 23, which are held fixed in both instances by braces 24, and each of these masts or stanchions 23 at its upper end is fitted with a guide yoke 25 through which passes a raising and lowering line or cable 26, having its forward end secured to the head 17, while the rear end is joined with a coupling chain 27 adapted to be adjustably and firmly fastened to the dumping body 10, next to its discharge or rear end. The lines or cables 26 work together so that when the body 10 is moved to dumping position the jib or boom will be raised, then on the return of such body to a loading position the jib or boom will be lowered. The load in the body 10 maintains the jib or boom 13 in a lowered position, and on the discharge of the load through tilting of the body 10, the jib or boom is automatically raised as it becomes overbalanced together with the weight of the article to be hoisted thereby.

The dumping body 10 can be tilted in any desirable manner and cooperating therewith is the hoist attachment when coupled therewith.

What is claimed is:

1. A vehicle of the kind described, comprising a dumping body swingable vertically, a hoisting jib in the form of a tapered skeleton frame provided with longitudinally disposed center braces vertically swingable on the front bumper of the vehicle, and connections between the body and the jib for the raising of the latter on the dumping movement of the said body.

2. A vehicle of the kind described, comprising a dumping body swingable vertically, a hoisting jib in the form of a tapered skeleton frame provided with longitudinally disposed center braces vertically swingable on the front bumper of the vehicle, connections between the body and the jib for the raising of the latter on the dumping movement of the said body, and a load carrying means adjustably connected with the jib.

3. A vehicle of the kind described, comprising a dumping body swingable vertically, a hoisting jib in the form of a tapered skeleton frame provided with longitudinally disposed center braces vertically swingable on the front bumper of the vehicle, connections between the body and the jib for the raising of the latter on the dumping movement of the said body, a load carrying means adjustably connected with the jib, and means for adjusting the throw of the connections between the body and the jib.

4. A vehicle of the kind described, comprising a dumping body swingable vertically, a hoisting jib in the form of a tapered skeleton frame provided with longitudinally disposed center braces vertically swingable on the front bumper of the vehicle, connections between the body and the jib for the raising of the latter on the dumping movement of the said body, a load carrying means adjustably connected with the jib, means for adjusting the throw of the connections between the body and the jib, and means swingingly connecting the jib to the vehicle.

5. A vehicle of the kind described, comprising a dumping body swingable vertically, a forwardly extending hoisting jib in the form of a tapered frame vertically swingable from the front portion of the vehicle, and connections between the rear of the dumping body and the tip portion of the jib for the raising of the latter on the dumping movement of the said body.

6. A vehicle of the kind described comprising a dumping body swingable vertically, a forwardly extending hoisting jib in the form of a tapered skeleton frame vertically swingable on the front bumper of the vehicle, and connections between the rear of the dumping body and the tip of the jib for the raising of the latter on the dumping movement of the said body.

JAMES PERRY LUCKETT.